US006469406B1

(12) United States Patent
Hwang et al.

(10) Patent No.: US 6,469,406 B1
(45) **Date of Patent: *Oct. 22, 2002**

(54) COOLING APPARATUS FOR A LINEAR MOTOR

(75) Inventors: Ji Hyun Hwang; Do Hyun Kim; Hyun Joo Hwang, all of Kyungki-do; Jang Sung Chun, Seoul, all of (KR)

(73) Assignee: Mirae Corporation, Choongchungnam-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/546,434

(22) Filed: Apr. 10, 2000

(30) Foreign Application Priority Data

| | | |
|---|---|---|
| May 27, 1999 | (KR) | 99-19300 |
| May 27, 1999 | (KR) | 99-19301 |
| Jul. 16, 1999 | (KR) | 99-28886 |
| Aug. 13, 1999 | (KR) | 99-33438 |

(51) Int. Cl.[7] ........ H02K 41/00
(52) U.S. Cl. ........ 310/12
(58) Field of Search ........ 310/12, 13, 14, 310/52, 16, 15, 27, 53–65

(56) References Cited

U.S. PATENT DOCUMENTS

| | | | | |
|---|---|---|---|---|
| 3,610,695 A | * | 10/1971 | Yabuta | 198/619 |
| 5,701,041 A | * | 12/1997 | Akutsu et al. | 310/12 |
| 5,783,877 A | * | 7/1998 | Chitayat | 310/12 |
| 5,825,104 A | | 10/1998 | Kondo et al. | 310/12 |
| 5,831,352 A | | 11/1998 | Takei | 310/12 |

FOREIGN PATENT DOCUMENTS

JP 354031518 A * 3/1979

* cited by examiner

*Primary Examiner*—Nestor Ramirez
*Assistant Examiner*—Guillermo Perez
(74) *Attorney, Agent, or Firm*—Rosenberg, Klein & Lee

(57) ABSTRACT

A cooling apparatus for a linear motor is disclosed which effectively cools heat generated when the motor is driven and provides an accurately maintained motor characteristics. The cooling apparatus for the linear motor include a blower provided outside the linear motor, at least one or more supply pipes, the supply pipes being provided to predetermined locations of the stator, air guide holes coupled to the supply pipes, respectively, for guiding flow of an introduced air, and control valves provided to predetermined locations of the supply pipes, for controlling an amount of an introduced air.

2 Claims, 5 Drawing Sheets

COOLING APPARATUS FOR A LINEAR MOTOR

BACKGROUND OF THE INVENTION

1. Field of the Invention

The present invention relates to a cooling apparatus for a linear motor, and more particularly to a cooling apparatus for a linear motor effectively cooling heat generated when the motor is driven and providing an accurately maintained motor characteristics.

2. Description of the Conventional Art

Linear motors having cold plates mounted on one edge of an armature are known in the art. Also, known are armatures having cooling coils or channel therein. These armatures are comprised of laminates of magnetic materials.

For example, a conventional linear motor, shown in FIGS. 1 and 2, is comprised of a "U"-shaped stator back plate 50 having inner surfaces thereof on which opposing permanent magnets 51, each having N- and S-poles, are sequentially disposed with alternate N- and S-poles arrangements; and a rotor 55 having a frame 54 to which a plurality of coil units 53 are provided, with a gap C between the coil units and the stator 52.

On a lower portion of the frame 54 are provided the coil units 53 having core, not shown, made of magnetic material or non-magnetic material around which plural coils are wound.

With the stator 52 and the rotor 55 being spaced apart from each other by a predetermined gap C, a thrust generated by the permanent magnets 51 and the coil units 53 makes it possible the movement of the rotor 55.

As described above, the operation of the linear motor is made by applying electric current to the coil units by a controller (not shown). When current is supplied to the coil constituting the coil units 53, magnetic field is generated from the coil and core. A thrust is then generated between magnetic field thus generated and permanent magnets 51 provided inside stator back plate 50, causing a linear motion of the rotor 55 provided to a lower portion of the frame 54. A moving speed of the rotor 55 linearly traveling along the inner side of the stator 52 and the thrust associated therewith and so forth may be controlled by the controller.

The repeated linear motion of the rotor 55 inside the stator 52 permits the production of eddy currents, currents and so forth induced in the permanent magnet 51. This generates relatively higher temperature heat between the coil units 53 and the permanent magnets 51. Heat generated between the coil units 53 and the permanent magnets 51 varies depending upon the rated currents determined by the coil diameter.

High temperature heat generated between the rotor and the stator causes magnetic characteristics of the rotor or the stator to be varied, which makes it difficult to perform a precise linear motor control. In other words, since the permanent magnet and coil units are generally made of material of lower thermal resistance, characteristics thereof are apt to vary due to heat generated between the rotor and the stator, thus resulting in different characteristics of the linear motor itself.

SUMMARY OF THE INVENTION

Therefore, it is an object of the present invention to solve the above-mentioned problems, by providing a cooling apparatus for a linear motor which effectively cools heat generated when the motor is driven and provides an accurately maintained motor characteristics.

Anther object of the present invention is to provide the cooling apparatus for the linear motor being capable of selectively cooling the motor by detecting a position of the moving linear motor to supply an air into air supply holes through a supply pipe installed at a bottom portion of a stator back plate, or to introduce an air into an air gap through supply pipes installed at both sides of the stator back plate.

DETAILED DESCRIPTION OF THE INVENTION

A cooling apparatus for a linear motor according to the present invention will be described in detail, with reference to the accompanying drawings.

Figure 1:
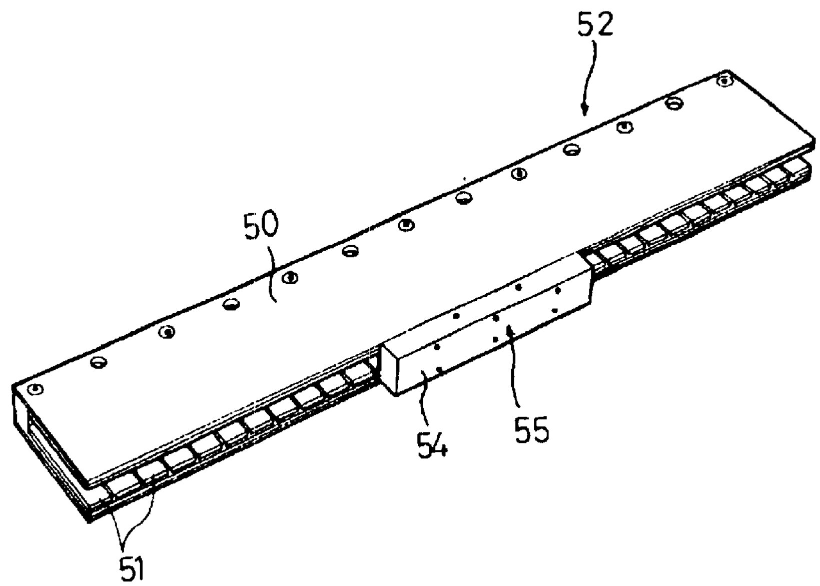
FIG. 1 is a perspective view of a linear motor conventionally used.
Figure 2:
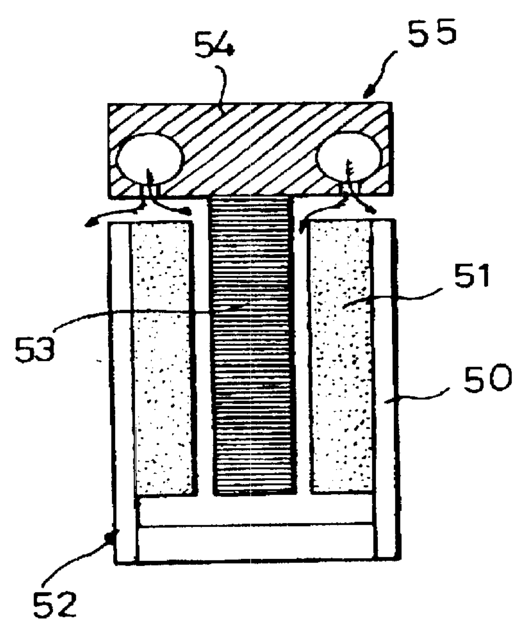
FIG. 2 is a vertical sectional view of FIG. 1.
Figure 3:
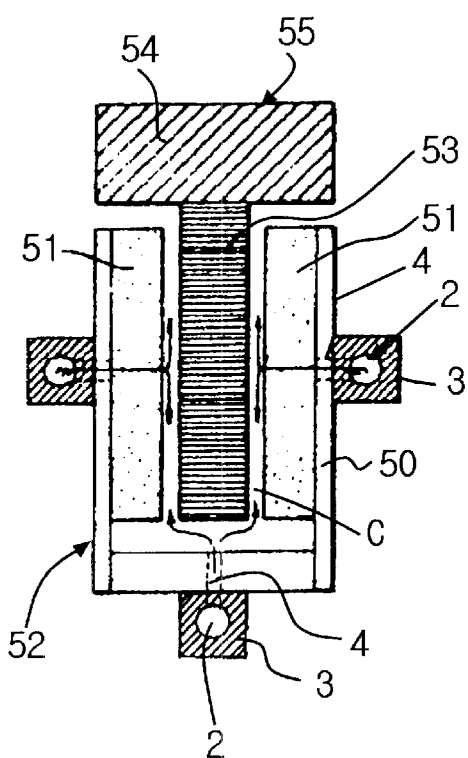
FIG. 3 is a sectional view of a cooling apparatus for a linear motor in accordance with a first embodiment of the present invention.
Figure 4:
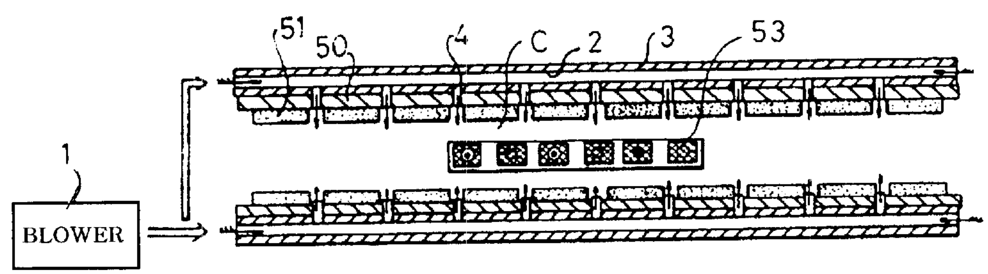
FIG. 4 is a horizontal sectional view of FIG. 3.

Referring to FIGS. 3 and 4, a linear motor to which the present invention is applied is shown to include: a stator 52 having a plurality of permanent magnets 51 provided on inner side of a stator back plate 50; and a rotor 55 provided to one side of a frame 54 and configured to be moved in a specified moving direction along an inner side of the stator 52. A blower 1 is further provided at a suitable location spaced apart from the linear motor.

The cooling apparatus for the linear motor according to a first embodiment of the present invention has the blower 1 placed at a predetermined location outside the linear motor, as shown in FIGS. 3 and 4. Air produced from the blower 1 is supplied through air supply pipes 3 each installed at a predetermined location of the stator 52 to predetermined areas of the stator 52 and the rotor 55. Referring to FIG. 3, the air supply pipes 3 may be preferably provided on both side surfaces and a bottom surface of the stator back plate 50 of the stator 52, but may be, alternatively, provided on one side surface and the bottom surface of the stator back plate 50. The air supply pipe 3 has a central portion thereof for forming a through hole 2, the through hole 2 communicating with air guide holes 4 for guiding the air introduced through the air supply pipe 3 into an air gap C in which the permanent magnets 51 are located.

The cooling apparatus for the linear motor according to the first embodiment can selectively supply the air from the blower 1 into a central area and lower area of the air gap C by way of the through hole 2 of the air supply pipe 3 and the air guide holes 4. In other words, since the air introduced through the through hole 2 of the air supply pipe 3 and the air guide holes 4 is supplied to the central area of the air gap C, an effective cooling of heat generated from the permanent magnet 51 and coil units 53 can be accomplished.

Only a natural air circulation may be, alternatively, employed without a direct connection of the blower 1 to the through hole 2, but with somewhat less cooling effect.

Figure 5:
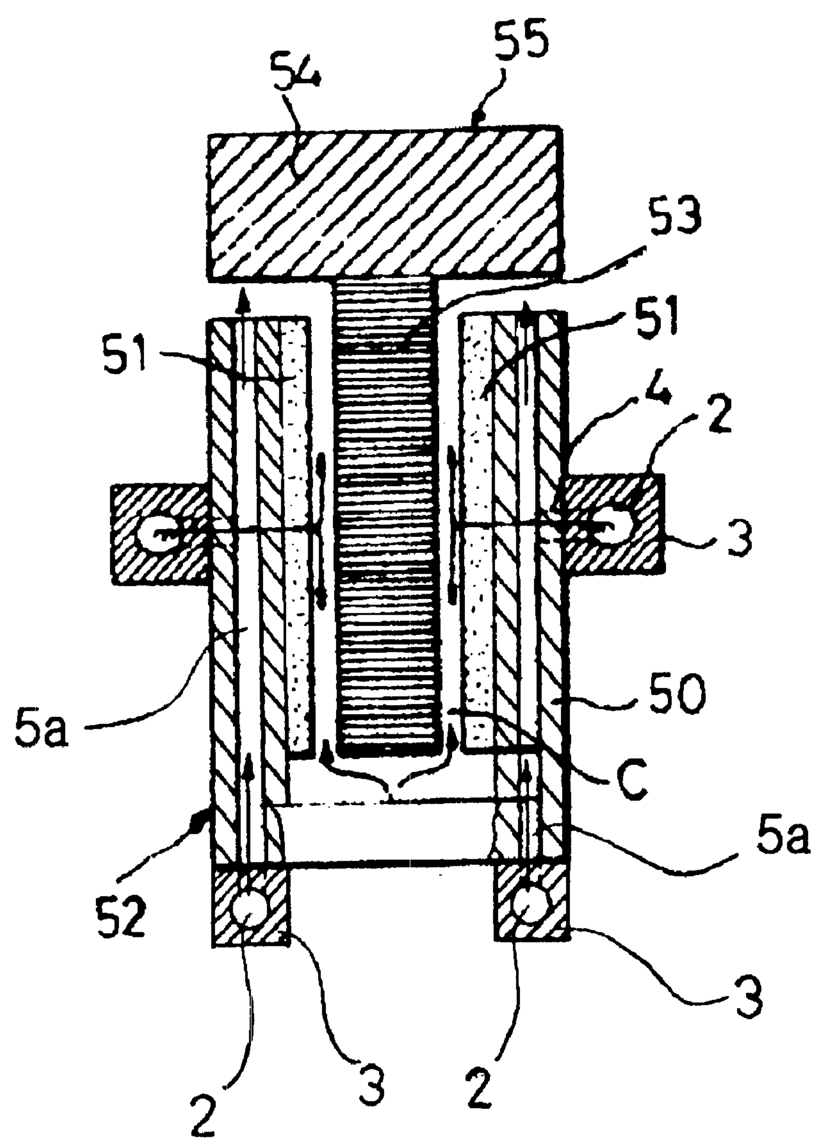
FIG. 5 is a sectional view of a cooling apparatus for a line motor in accordance with a second embodiment of the present invention.

Next, as shown in FIG. 5, a cooling apparatus for a linear motor according to a second embodiment of the present invention has a configuration similar to that of the first embodiment, except that the air supply pipe 3 having a plurality of through holes 2 therein is provided at a bottom surface of the stator back plate 50, the through holes 2 communicating with the air supply holes 5*a,* respectively. The air supply holes 5*a* longitudinally extend along the permanent magnet 51.

The cooling apparatus for a linear motor according to a second embodiment thus constructed offers an advantage of further improvement in effectively cooling the permanent magnets by circulating an air passing through both sides of the permanent magnet, as well as in cooling the coil units 51. The circulation of the introduced air, as indicated by arrow in FIG. 5, provides an effective cooling operation.

Figure 6:
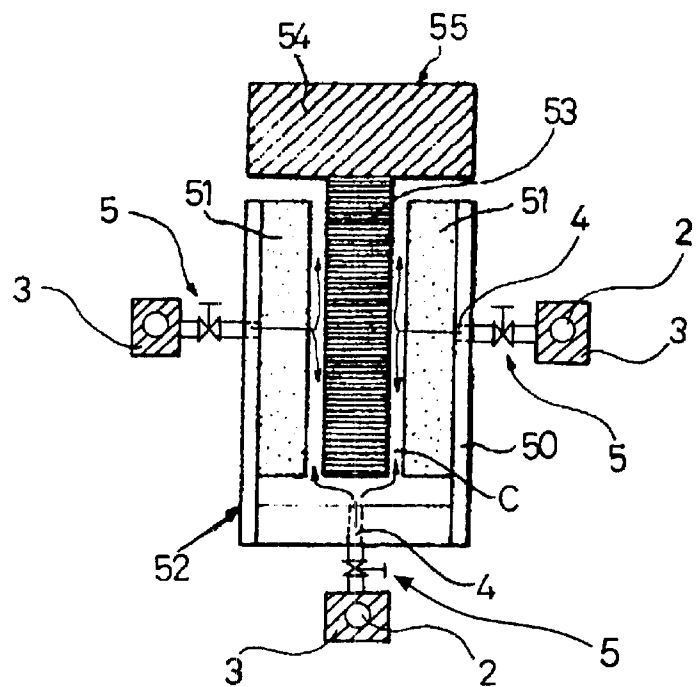
FIG. 6 is a sectional view of a cooling apparatus for a linear motor in accordance with a third embodiment of the present invention.
Figure 7:
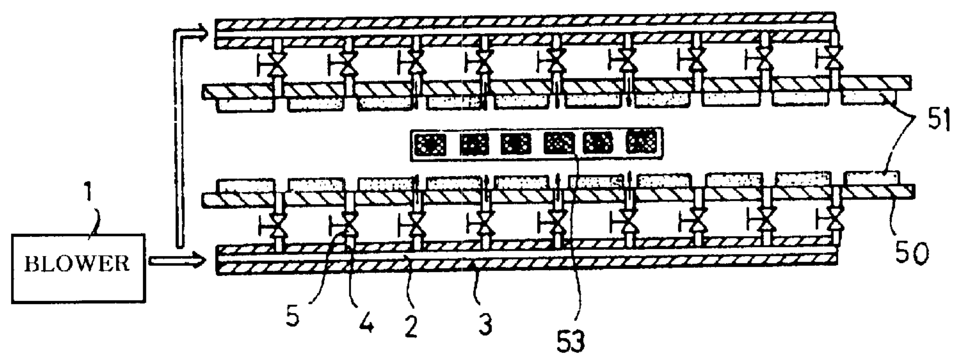
FIG. 7 is a horizontal sectional view of FIG. 6.

Next, a cooling apparatus for a linear motor according to a third embodiment of the present invention is shown in FIGS. 6 and 7. In the third embodiment, a control valve 5 is installed on predetermined location of the air supply pipe 3. The control valve 5 is selectively opened or closed to supply an air into a central area or lower area of the air gap C, when the position of the rotor 55 is detected by a position detecting means (not shown).

Between the air supply pipe 3 and the stator back plate 50 are installed plural control valves 5 for controllably providing an intermittent air flow of the air guide hole 4. For this, a control unit (not shown) is used for allowing only the control valve 5 located corresponding to the moving rotor 55 to become ON, and the remaining control valves 5 to remain OFF, thus resulting in minimal use of air required in a cooling operation without the air being wasted.

It is noted that the means for detecting position of the rotor 55 may be embodied in a conventional manner, e.g., by a hole sensor provided to the stator 52 and a magnet (not shown) for sensing the hole sensor and thus detecting a position, attached to a bottom surface of the rotor 55.

The operation of the third embodiment according to the present invention will be described below.

The principal operation of the third embodiment is similar to that of the first embodiment, therefore the detailed description thereof will be omitted, except for differences therebetween.

With the use of the linear motor during a predetermined time period, high temperature heat is generated from the coil unit 53 and the permanent magnet 51. The cooling of the generated heat is not dependent upon the simple supply of an air through the air gap C. The cooling is made by a concentrated cooling of only a heating area, which is made possible by, after detecting the position of the rotor 55 by the position detecting unit, only the control valve 5 located corresponding to the position of the moving rotor 55 being ON by the controller. Namely, the remaining valves 5 not facing with the moving rotor 55 remain OFF, so that an air is not supplied into the air gap C. The air supply by only the turned-ON control valve located corresponding to the position of the moving rotor 55 prevents undesirable loss of the air supplied to the air gap C. An air by a saved amount can also be directly supplied to the over-heated area of the rotor 55, and therefore the relative amount of air further increases which can be used for cooling the rotor 55. Thus, the cooling efficiency is further enhanced.

An embossing may be applied to a surface of the permanent magnet 51 or the coil unit 53, the surface being contact with an air, within limits that the motor characteristics are maintained. This further increases in an air contact area, so that a better cooling efficiency is provided.

Figure 8:
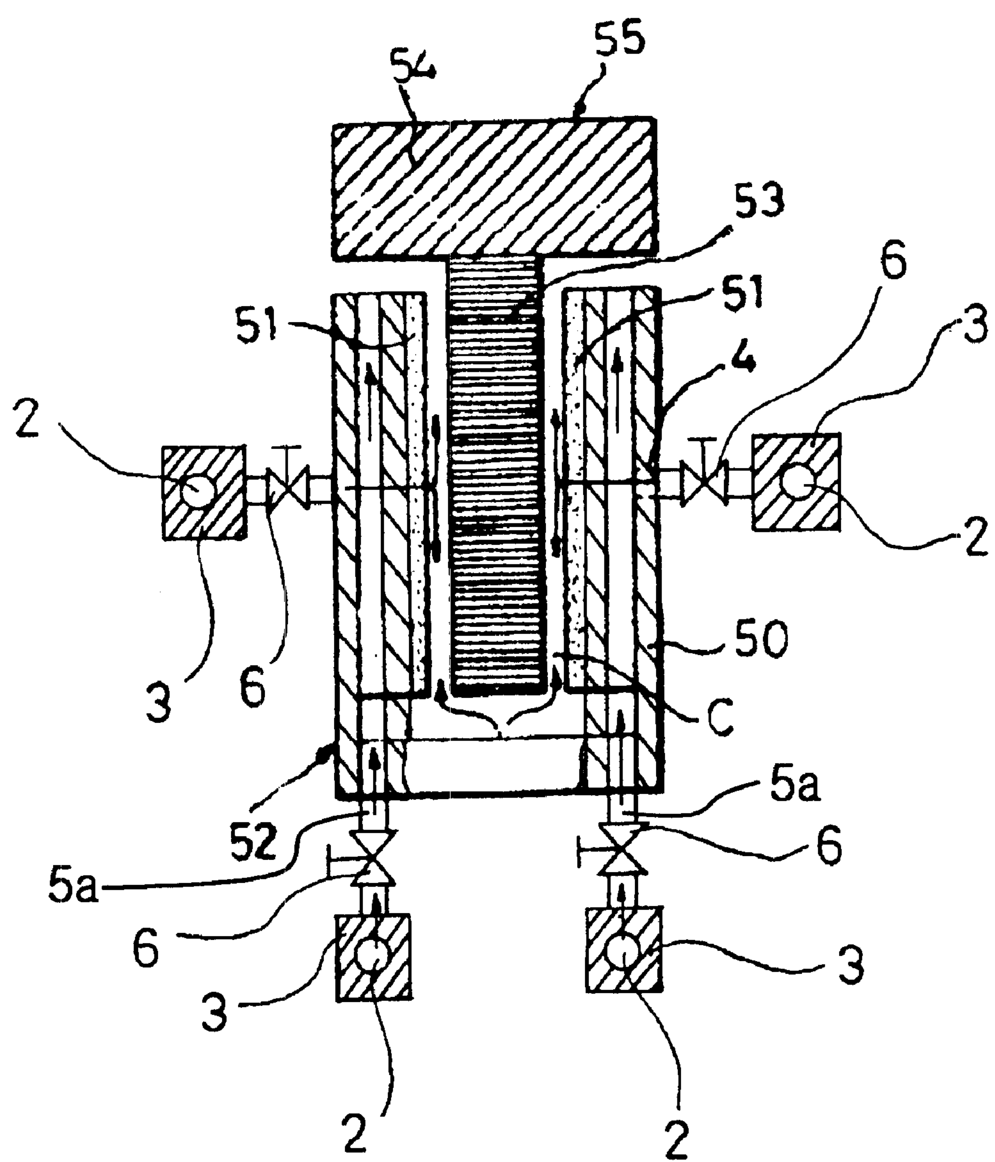
FIG. 8 is a sectional view of a cooling apparatus for a linear motor in accordance with a fourth embodiment of the present invention.

FIG. 8 shows a forth embodiment of the present invention where control valves 6 are, respectively, installed on predetermined locations of the air supply pipe 3. The general operation of the fourth embodiment is similar to that of the above-described third embodiment, therefore the detailed description thereof will be omitted.

According to the foregoing, the linear motor of the present invention provides a minimal loss of a supplied air by supplying an air into the air gap C formed between the permanent magnet and the coil unit, and the characteristics fluctuation of the linear motor which may be caused by heat generated during the control of the linear motor can be minimized. Further, with an embossing applied to an air contact surface of the permanent magnet 51 or the coil unit 53 within limits that the motor characteristics are maintained, an increase in an air contact area and a thus better cooling efficiency can be provided.

What is claimed is:

1. A linear motor including a stator having a plurality of spaced apart permanent magnets inside a stator back plate, the stator back plate having a bottom and side walls, and a rotor provided on one side of a frame and adapted to move along an inner side of the stator, the linear motor further comprising:

a blower provided outside the linear motor;

a plurality of supply pipes coupled by one end thereof to said blower and provided at predetermined locations externally of the stator, said supply pipes extending in proximity to the bottom and the side walls of the stator back plate along the travel trajectory of the rotor within the inner side of the stator;

a plurality of air guide holes formed through the bottom and the side walls of the stator back plate at predetermined locations thereat, said air guide holes formed through said side walls being in alignment with the spaces defined between each pair of adjacent said permanent magnets, each of said air guide holes being coupled to a respective one of said supply pipes in fluid communication and in transversal relationship therewith for guiding flow of air into direct contact with heat generating structures of said linear motor; and a plurality of control valves provided at predetermined locations of said supply pipes, each said control valve being coupled between a respective one of said supply pipes and a respective one of said air guide holes and being selectively opened/closed according to a position of the rotor moving along the inner side of the stator for controlling an amount of an introduced air and an area of the air introduction into direct contact with the heat generating structures of said linear motor.

2. A linear motor comprising, (a) a stator, including:

a U-shaped stator back plate having a pair of side walls and a bottom portion extending between said side walls at bottom ends thereof, and a plurality of spaced apart permanent magnets disposed along an inner surface of said side walls of said stator back plate;

(b) a rotor, including:

a frame arranged at top ends of said side walls of said stator back plate for sliding therealong, and a plurality of coil units attached to one side of said frame and extending therefrom towards said bottom portion of said stator back plate between said permanent magnets of said stator, a gap being defined between said coil units and said stator;

(c) cooling means provided for removing excessive heat generated at said linear motor, said cooling means comprising:

a blower disposed outside said linear motor;

a plurality of air supply pipes coupled at one end thereof to said blower and extending outside of said stator in proximity to external surfaces of said bottom portion and said side walls of said stator back plate;

a plurality of air guiding passages extending between interior of said air supply pipes and said gap defined between said coil units and said stator to introduce a flow of air directed from said blower into said gap in direct contact with said coil units and said permanent magnets, said air guiding passages including air guiding channels crossing at said side walls at positions aligned with the spaces defined between each pair of adjacent said permanent magnets, and said air guiding passages further include air guiding channel crossing said bottom portion of said stator back plate; and, a plurality of control valves, each operatively coupled between a respective one of said air supply pipes and a respective one of said plurality of air guiding passages and controlled for introducing the flow of air directly to a respective heat generating structure of said linear motor.

* * * * *